US006639551B2

(12) United States Patent
Li et al.

(10) Patent No.: US 6,639,551 B2
(45) Date of Patent: Oct. 28, 2003

(54) METHOD OF INTERFERENCE CANCELLATION BASED ON SMART ANTENNA

(75) Inventors: Feng Li, Beijing (CN); Shihe Li, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 10/073,567

(22) Filed: Feb. 11, 2002

(65) Prior Publication Data

US 2002/0109631 A1 Aug. 15, 2002

Related U.S. Application Data

(63) Continuation of application No. PCT/CN00/00170, filed on Jun. 22, 2000.

(30) Foreign Application Priority Data

Aug. 11, 1999 (CN) ........................................ 99111371 A

(51) Int. Cl.[7] ............................... G01S 3/16; H04B 1/10

(52) U.S. Cl. ........................ 342/381; 342/378; 455/296; 375/144

(58) Field of Search .................................. 342/378, 381, 342/382; 375/144, 148, 285, 346; 455/63, 295, 296

(56) References Cited

U.S. PATENT DOCUMENTS 4,266,296 A * 5/1981 Ishigaki ...................... 455/303
4,952,193 A * 8/1990 Talwar ......................... 455/63
5,576,717 A 11/1996 Searle et al.
5,596,329 A 1/1997 Searle et al.
5,692,018 A * 11/1997 Okamoto .................... 375/347
6,192,067 B1 * 2/2001 Toda et al. ................. 375/144

FOREIGN PATENT DOCUMENTS

| | | |
|---|---|---|
| CN | 1053313 C | 11/1997 |
| CN | 1220562 | 6/1999 |
| EP | 0 647 982 A2 | 4/1995 |
| EP | 0 899 894 A2 | 3/1999 |
| GB | 2281011 | 2/1995 |
| WO | WO 98/38805 | 9/1998 |

* cited by examiner

*Primary Examiner*—Dao Phan
(74) *Attorney, Agent, or Firm*—Alston & Bird LLP

(57) ABSTRACT

This invention discloses an interference cancellation method based on smart antenna, which can solve various interference in mobile communication systems such as multipath propagation, etc., while using smart antenna. The invention includes the steps of: with a beam forming matrix, beam forming the output signal of a receiver based on smart antenna, then getting a set of digital signals $NR_k(m)$; canceling other users main path signal included in $NR_k(m)$, then getting another set of digital signals $NS_k(m)$, which only includes needed signals and all interference signals; searching in digital signal $NS_k(m)$ and getting all multipath interference signals coming from other users; canceling other multipath interference signal in $NS_k(m)$; and superposing the user main path and each multipath signal in phase coincidence, then getting a digital signal with interference canceled.

17 Claims, 4 Drawing Sheets

Output receiving data

METHOD OF INTERFERENCE CANCELLATION BASED ON SMART ANTENNA

CROSS REFERENCE TO RELATED APPLICATIONS

This is a continuation application of PCT/CN00/00170, filed Jun. 22, 2000, which is incorporated herein by reference in its entirety.

FIELD OF THE TECHNOLOGY

The present invention relates generally to wireless communication technology, and more particularly to a process for cancelling interference in wireless base stations with smart antenna or in user terminals.

BACKGROUND OF THE INVENTION

In modern wireless communication systems, especially in code division multiple access (CDMA) wireless communication systems, smart antennas are generally used to increase system capacity, system sensitivity and communication distances using lower emission power.

The Chinese patent named "Time Division Duplex Synchronous Code Division Multiple Access Wireless Communication System with Smart Antenna" (CN 97 1 04039.7) discloses a base station structure for a wireless communication system with smart antennas. The base station includes an antenna array consisting of one or plural antenna units, corresponding radio frequency feeder cables and a set of coherent radio frequency transceivers. Each antenna unit receives signals from user terminals. The antenna units direct the space characteristic vectors and direction of arrival (DOA) of the signals to a baseband processor. The processor then implements beam formation by the receiving antenna using a corresponding algorithm. Among them, any antenna unit, corresponding radio frequency feeder cable and coherent radio frequency transceiver together is called a link. By using weight, getting from the up link receiving beam forming of each link in the down link transmitting beam forming, the entire functionality of smart antennas can be implemented, under symmetrical radio wave propagation.

A primary aspect of modern wireless communication systems is mobile communication. Mobile communication works within a complex and variable environment (reference to ITU proposal M1225). Accordingly, severe influences of time-varying and multipath propagation must be considered. The Chinese patent referenced above as well as many technical documents concerning beam forming algorithms of smart antenna conclude increased functionality will result with increased algorithm complexity. Nevertheless, under a mobile communication environment, beam forming must be completed in real time, and algorithm-completion time is at a microsecond level. As another limitation of modern microelectronic technology, digital signal processing (DSP) or application specific integrated circuits (ASIC) cannot implement highly complex real time processing within such short time periods.

Faced with this conflict, CDMA mobile communication systems use a simple maximum power composite algorithm. This is both simple and also can solve problems associated with the time delay of multipath component composition within a chip width. Nevertheless, in modern CDMA mobile communication systems in a mobile environment, both the time delay and amplitude of the multipath propagation component is increasing, so that interference is still severe.

As a result, under a mobile communication environment, simple and real time beam forming algorithms of smart antennas not only cannot solve the multipath propagation interference problem, but also cannot thoroughly solve system capacity problems of CDMA mobile communication systems.

Technologies such as the Rake receiver and Joint Detection or Multi-User Detection have been widely studied for use in CDMA mobile communication systems in an attempt to solve interference problems associated with multipath propagation. Nevertheless, neither the Rake receiver nor multiuser detection technology can be directly used in mobile communication systems with smart antennas. Multiuser detection technology processes the CDMA signals of multiple code channels. However, smart antenna technology implements beam forming for each channel code separately, and after channel estimation and matched filter, all user terminal data are solved at the same time using an inverse matrix. So it is difficult to take advantage of the diversity provided by user multipath technology. Rake receiver technology includes user main multipath components, but it also destroys the phase relationship between antenna units of an antenna array. Another limitation of Rake receiver technology is that the user number is the same as the spread spectrum coefficient, which makes it impossible to work under full code channel circumstances.

There is a two-dimensional smart antenna technology, but it is in a research stage and its algorithm is immature and complex.

There is another method which processes multiuser detection after using smart antenna; but at this time as each code channel has been separated, processing multiuser detection must be separated for each code channel. As a result this technology not only cannot fully bring multiuser detection function into play, but also greatly increase the complexity of baseband signal processing.

SUMMARY OF THE INVENTION

To increase system capacity and improve performance for CDMA wireless communication systems, it would be helpful to provide a simple and real time interference cancellation method convenient for use in CDMA wireless communication systems based on smart antenna.

Therefore, an object of the invention is to provide an interference cancellation method based on smart antenna. The invention allows CDMA mobile communication systems or other mobile communication systems to use smart antennas and simple maximum power composite algorithms, while efficiently solving interference problems produced by multipath propagation, etc.

A further object of the invention is to provide a set of new digital signal processing methods, which can be used in CDMA mobile communication systems or other mobile communication systems, to allow the mobile communication system to solve interference produced by multipath propagation, etc., while using smart antennas.

The invention of an interference cancellation method based on a smart antenna, comprises:

a) with a beam forming matrix provided by a real time beam forming algorithm, implementing beam forming for an output digital signal of a receiver based on smart antenna and providing a set of digital signals, represented as $NR_k(m)$, after beam forming, where k represents code channels and m represents sample points;

b) canceling the main path signals of other users included in the set of digital signals $NR_k(m)$ after beam forming, and getting another set of digital signals, represented as $NS_k(m)$, which only includes needed signals and all interference signals, where k represents code channels and m represents sample points;

c) searching in digital signals $NS_k(m)$ and getting all multipath signals distributed on the formed beam direction;

d) canceling multipath interference signals coming from other users in digital signals $NS_k(m)$; and e) superposing the main path and the multiple path signals of the working user terminals in phase coincidence to provide a digital signal with interference canceled.

In step a), the output digital signal of the receiver based on smart antenna is in sample level.

Step a) is performed in a base band signal processor. The steps include: synchronizing and eliminating over sampling of the output digital signal of a receiver based on smart antenna; de-scrambling, de-spreading and dividing it into each code channel signal; forming a receiving beam for every link with a beam forming composite algorithm in a beam former, and getting the composite results.

The beam forming algorithm can be a maximum power composite algorithm.

Step a) further comprises: demodulating the smart antenna output signal, outputted by a beam former, and detecting the signal-to-noise ratio of the training sequence. When the signal-to-noise ratio is greater than a threshold value, the receiving data is directly outputted and the procedure is ended. When the signal-to-noise ratio is less than a threshold value, the succeeding steps are executed.

Step b) further comprises: solving the main path of signals comings from other terminal users in the formed beam of working code channels; spreading the spectrum for the main path signals, adding scrambling code to the main path signals and recovering the main path signals to a sample level digital signal; and subtracting the main path signals of the other users with energy greater than a threshold value from said digital signals $NR_k(m)$ to get $NS_k(m)$.

Solving the main path of signals coming from other terminal users in the formed beam of the working code channel comprises solving the signal voltage level of the other code channels in the working code channel beam.

Step c) further comprises: moving a sample point position individually within one symbol and getting multiple sets of chip level signal; solving the correlation for them with a known scrambling code and getting multiple sets of output with energy greater than a threshold value; adding a known scrambling code to the output and recovering multipath interference of multiple sets with sample level; subtracting multipath interference coming from other users from digital signals $NS_k(m)$ from step b), superposing main path and multipath signals of the $k^{th}$ channel in phase coincidence and getting the $k^{th}$ channel sample value after interference cancellation; de-scrambling, de-spreading and demodulating sample value of the $k^{th}$ channel, then getting the $k^{th}$ channel signal after interference cancellation, where k is any positive integer.

Searching in step c) is only taken within one symbol, Searching times needed are equal to the sample numbers, within each chip, times the spread spectrum coefficient, then minus 1.

Step d) further comprises: subtracting interference digital signals, coming from other terminal users, from digital signals $NS_k(m)$ from step b) to cancel multipath interference signals coming from other terminal users.

Step d) is taken on sample level, and the signals concerned are converted to sample level signals.

Step e) further comprises: with canceling sample value of main path and multipath interference signals, coming from other users, getting each chip value; after de-scrambling and de-spreading with $k^{th}$ spread spectrum code, superposing main path and multipath signals coming from working terminal users in phase coincidence, then getting outputting signals after interference cancellation; after demodulating, getting needed results after interference cancellation.

Steps a), b), c), d) and e) cancel interference for all channels whose signal-to-noise ratio is less than a threshold value.

Steps a), b), c), d) and e) are used for interference cancellation in mobile communication base stations. Steps b), c), d), and e) are used for interference cancellation in user terminals.

In the method of the invention, for CDMA mobile communication systems having longer training sequences (Pilot or Midamble) in frame designed structures, as in real mobile communication systems not all working code channels are severely influenced by multipath propagation, etc., so signal quality can be pre-detected at smart antenna output, i.e., detecting signal-to-noise ratio (error code) in receiving training sequence (Pilot or Midamble). For channels for which there is no error code or the number of error codes is less than a set value, then further processing is not needed. In this way the number of channels needed to be further processed is greatly decreased and the complexity of base band signal processing is greatly degraded.

In the method of the invention, for CDMA mobile communication systems having no longer training sequence (Pilot or Midamble) in frame designed structures, or for CDMA mobile communication systems having longer training sequence (Pilot or Midamble) in frame designed structures but there are severe interference and severe error code channels, then it is necessary to use the method of the invention to cancel multipath interference in order to have correct receiving.

The method of the invention proposes a simple maximum power composite algorithm, which allows beam forming in symbolic level and can be operated in real time.

Using the new multipath interference cancellation technology of the invention, most of multipath interference coming from this channel or other channels is canceled (multipath interference that is not canceled has a time delay with integer multiple of symbol width, but its appearing probability is low). Thus interference influence of multipath propagation, etc. is canceled at a maximum limit to reach the purpose of correct receiving. Calculation volume of the invention is limited, with present commercial DSP it can be implemented thoroughly.

Although the method of the invention points to mobile communication systems with CDMA, it can be also be used in mobile communication systems with frequency division multiple access (FDMA) and time division multiple access (TDMA).

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
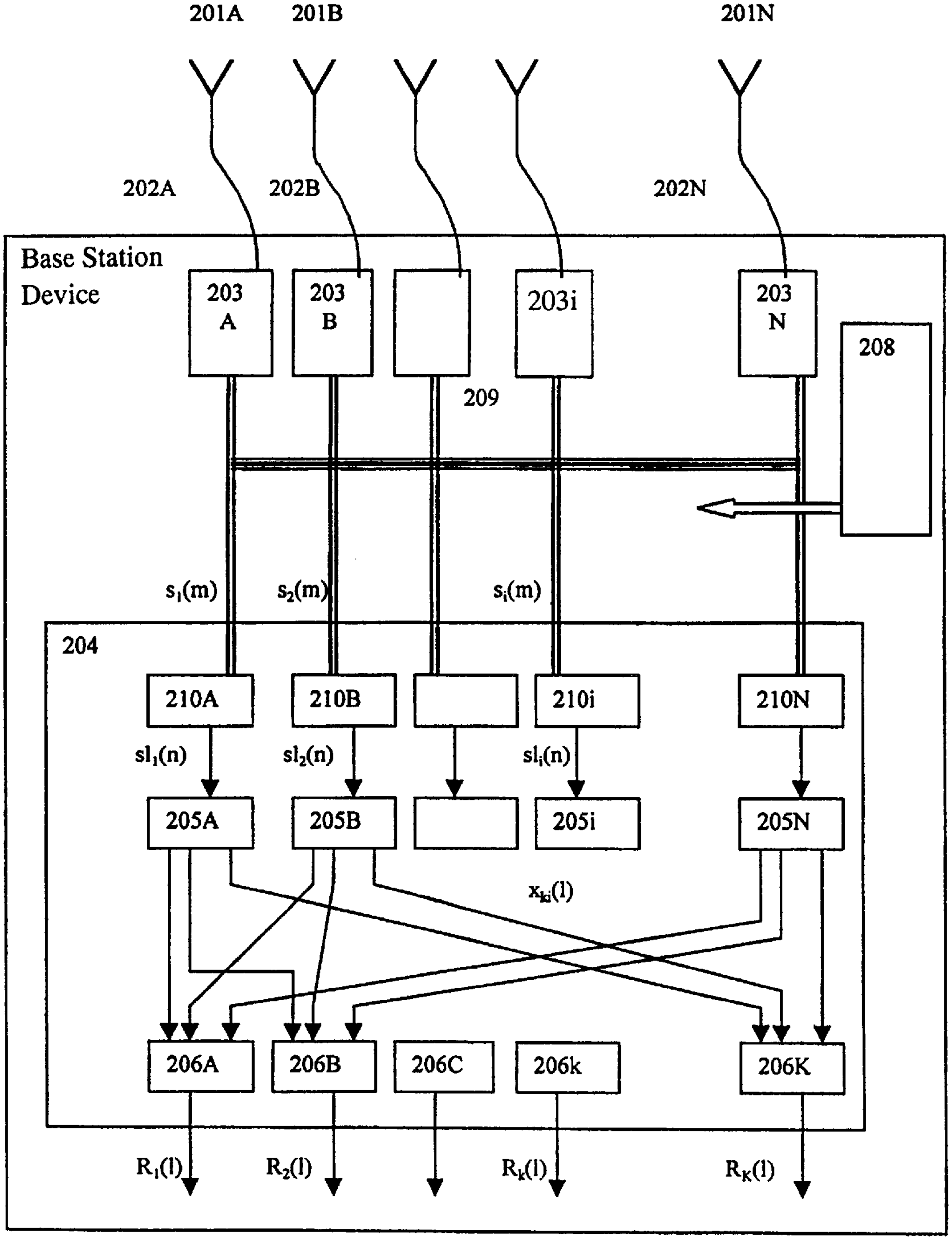
FIG. 1 is a base station structure diagram of CDMA mobile communication with smart antenna.

FIG. 1 shows a typical base station structure of a wireless communication system, such as a mobile communication system or a wireless user loop system, and the like, having a smart antenna. The base station structure includes N identical antenna units 201A, 201B, . . . , 201N; N substantially identical radio frequency feeder cables 202A, 202B, . . . , 202N; N radio frequency transceivers 203A, 203B, . . . , 203N and a baseband signal processor 204. All radio frequency transceivers 203A, 203B, . . . , 203N use the same local oscillator 208 to guarantee that each radio frequency transceiver works in coherence.

All radio frequency transceivers 203A, 203B, . . . , 203N have an Analog to Digital Converter (ADC) and a Digital to Analog Converter (DAC), so that the input and output signals of the baseband signal processor 204 are all digital signals. Radio frequency transceivers 203A, 203B, . . . , 203N are connected with the baseband signal processor 204 by a high speed digital bus 209.

The basic working principles of a base station with a smart antenna and the working method of a smart antenna have been described in the Chinese patent named "Time Division Duplex Synchronous Code Division Multiple Access Wireless Communication System with Smart Antenna" (CN 97 1 04039.7). A method of interference cancellation for smart antennas receiving signals is also implemented in the base station structure. The invention does not make any changes to smart antenna working principles and characteristics. The invention also does not discuss processing of transmitting signals; it only describes an interference cancellation method for receiving signals.

Figure 3:
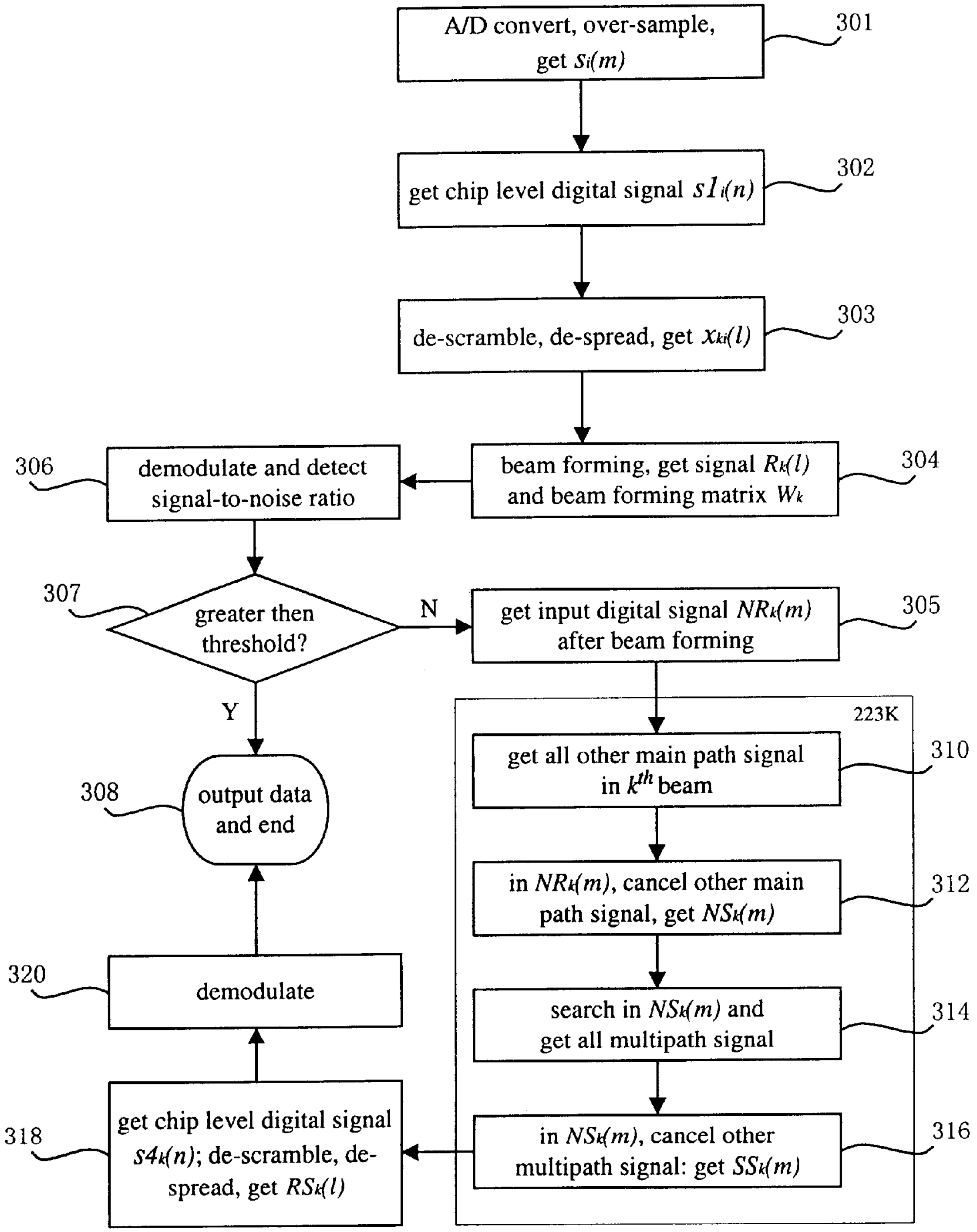
FIG. 3 is a flow chart of interference cancellation method of the invention.

FIG. 1 and steps 301 to 304 of FIG. 3 illustrate the working mode of a smart antenna implemented by a baseband signal processor 204 of a base station structure. Suppose the CDMA wireless communication system includes K code channels, and the smart antenna system includes N antenna units, N radio frequency feeder cables and N radio frequency transceivers. In this case, the $i^{th}$ receiving link is described below as an example of the invention.

In Step 301 a receiving signal, received from antenna unit 201*i* is converted from analog to digital (ADC), and sampled by the $i^{th}$ radio frequency transceiver 203*i*. The radio frequency transceiver 203*i* outputs a digital signal, referred to as $s_i(m)$, where m is the $m^{th}$ sampling point. In step 302, digital signal $s_i(m)$ is synchronized, its over-sampling is eliminated by block 210, and then a chip level digital signal is provided, referred to as $sl_i(n)$, where n represents the $n^{th}$ chip. In step 303 chip level digital signal $sl_i(n)$ is de-scrambled and de-spread by block 205, and then it is separated into K numbers of code channel symbolic level signals, known as $x_{ki}(l)$, where l represents the $l^{th}$ symbol. In step 304 K numbers of code channel symbolic level signals pass K beam formers 206, respectively, and with a certain beam forming composite algorithm, the $i^{th}$ link receiving beam is formed and its composite result provided, as represented by the formula:

$$R_k(l) = \sum_{i=1-N} x_{ki}(l) * w_{ik}(l) \quad (1)$$

where k=1, 2, . . . , K; $w_{ik}(l)$ is a beam forming coefficient of the $k^{th}$ code channel in the $i^{th}$ link, when using the maximum power composite algorithm, $$w_{ik}(l)=x_{ki}^*(l) \quad (2)$$

where $x_{ki}^*(l)$ is a conjugate of a complex number $x_{ki}(l)$, to calculate the beam forming matrix $W_k$ on a symbolic level, where $R_k(l)$ is the output of the smart antenna system.

In a time division duplex (TDD) system, when the up link (base station receiving) beam is formed, the weight of each link can be directly used to down link (base station transmitting) beam forming to take full advantage of the smart antenna. Output $R_k(l)$, noted above, is processed, for example, by demodulation, etc., to provide a receiving signal.

Figure 2:
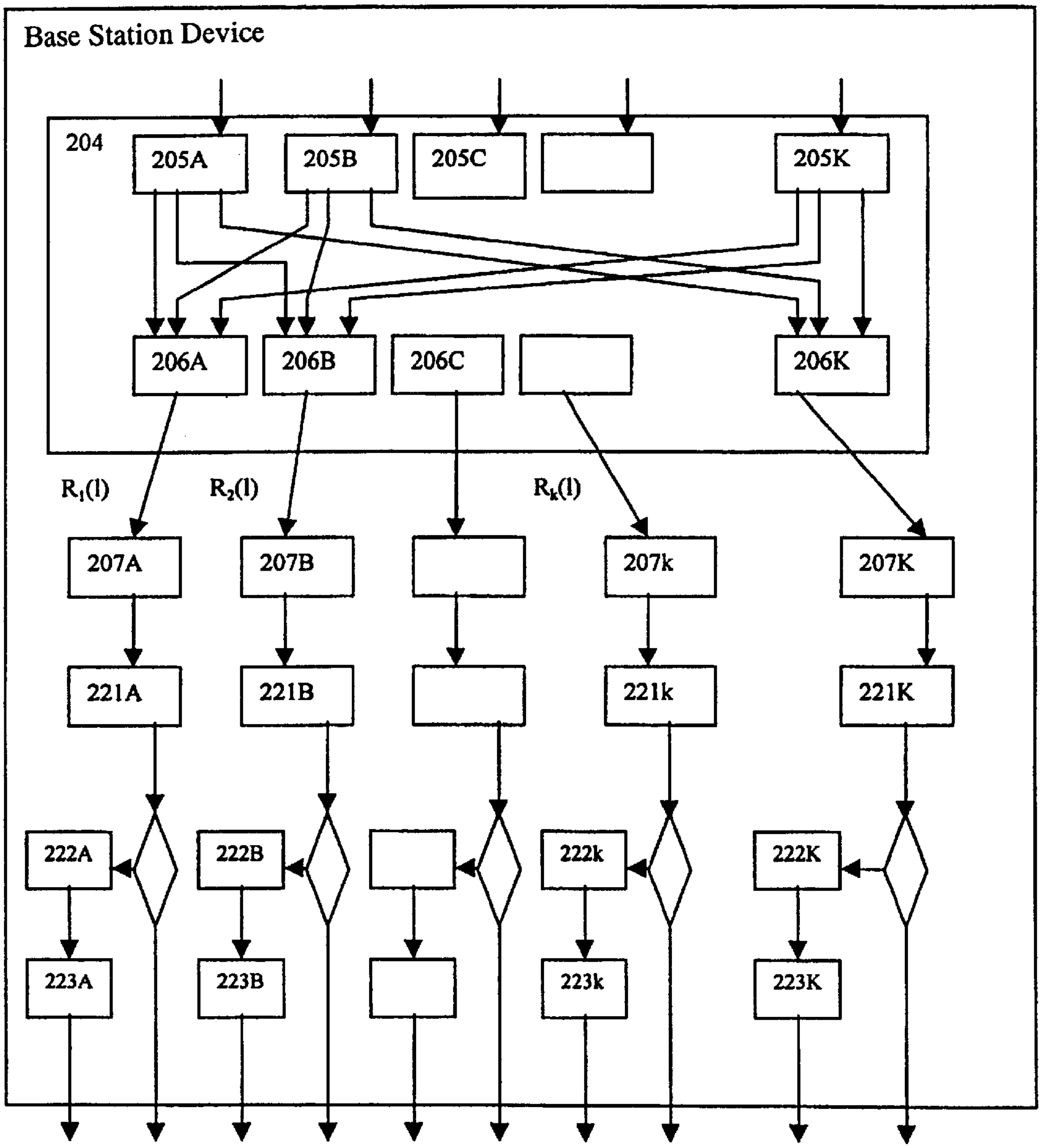
FIG. 2 is a principle diagram of signal-to-noise ratio detection and processing procedure of smart antenna output in FIG. 1.

FIGS. 2 and 3 show interference needed to be cancelled in the base station of a CDMA system with smart antenna, and the new signal processing method related to the invention.

In Step 306, a smart antenna system output signal $R_k(l)$, outputted by baseband signal processor 204, is demodulated and the signal/noise ratio of its training sequence is detected (the training sequence in any mobile communication system is known, and can be obtained by a comparison) by K demodulation units 207A, 207B, . . . , 207K and K signal/noise ratio (S/N) detection units 221A, 221B, . . . , 221K. If the signal/noise ratio of the output signal is greater than a preset threshold (FIG. 3 step 307 and FIG. 2 diamond block), then in the corresponding code channel there is no error code or number of error code less than a set value. Then step 308 can be executed. In step 308, the receiving signal is directly outputted, the received data is outputted and processing is ended. If the signal/noise ratio of the output signal is less than a preset threshold (FIG. 3 step 307 and FIG. 2 diamond block), then step 305 is executed. In step 305, the process goes to the next signal processing stage (if there is no training sequence in the wireless communication system, then there is no need to detect the signal/noise ratio in steps 306 and 307).

In Step 305, blocks 222A, 222B, . . . , 222K provide the input digital signal $NR_k(m)$ after beam forming. First, as an example, suppose the processed code channel is the code channel used by the $k^{th}$ user terminal. Then the $k^{th}$ code channel beam forming matrix is $w_{ik}(l)$, beam forming of the received digital signal is made directly and a set of new data $NR_k(m)$ is formed as represented by the formula:

$$NR_k(m) = \sum_{i=1-N} S_i(m) * w_{ik} \quad (3)$$

where k=1, 2, . . . , K; $W_{ik}$ is the mean value of the $k^{th}$ code channel beam forming matrix within one frame, and is calculated by the formula:

$$w_{ik} = \frac{1}{L}\left(\sum_{l=1-L} w_{ik}(l)\right) \quad (4)$$

where L is a symbol number needed to be counted. L must be less or equal to the symbol numbers of one frame. The definition of $W_{ik}(l)$ is in formula (1). $s_i(m)$ is a multiple channel CDMA signal received by the $i^{th}$ link, as shown in FIG. 1.

The newly obtained data signal $NR_k(m)$ is sent to K multipath processors 223A, 223B, . . . , 223K. Here it is processed with the new processing method of the invention. The process of the invention includes the following steps: first steps 310 and 312, second step 314, third step 316 and fourth step 318; as shown in FIG. 3.

In the first step, the main path component from other users is cancelled and it is included in a signal level of the $k^{th}$ beam of the input digital signal $NR_k(m)$ after beam forming. The processing procedure of this first step includes:

1) Calculating all other main path signals in the $k^{th}$ beam, and calculating other code channel signal levels, which are in the working code channel of the $k^{th}$ beam, i.e. calculate $$F_v(l) = \sum_{i=1-N} x_{vi}(l) * w_{ik}(l) \quad (5)$$

where v=1, 2, . . . , K, the total power of the other code channels in the $k^{th}$ code channel is $$p_v = \sum_{l=1-L} F_v(l) * F_v * (l) \quad (6)$$

where $F_v*(l)$ is a conjugate of a complex number $F_v(l)$, L are symbol numbers needed to be counted (L should be less or equal to the symbol numbers of one frame);

Comparing $p_v$ with the threshold value set by the system. If there are U number of values are greater than the threshold, called U number of signals needed to be cancelled, then U number of signals cannot be cancelled by spatial filter of the smart antenna. For the $l^{th}$ symbol, this signal output can be represented as $F_u(l)$.

Spreading the spectrum for $F_u(l)$ with the $u^{th}$ spread spectrum code, getting the spread spectrum signal $f_u(n)$, and solving the mean amplitude in the $k^{th}$ link of each signal needed to be cancelled as represented by the formula:

$$u = \frac{1}{L}\left(\sum_{l=1-L} \frac{|F_u(l)|}{R_u(l)}\right) \quad (7)$$

where $R_u(l)$ has been solved by formula (1), u=1, 2, . . . , U; and

Again spreading the spectrum for this signal, putting the known scramble code on it, and then recovering its input digital signal as represented by the formula:

$$s2_u(n)=u*f_u(n)*pn\_cod(n) \quad (8)$$

2) With $NR_k(m)$, canceling the other main path signals to provide $NS_k(m)$. In this step, interference needed to be cancelled is subtracted from the total input digital signal after beam forming. Then digital signals after beam forming, which only include the needed code channel (the $k^{th}$ channel) and all multipath interference of the needed code channel, are represented by the formula:

$$NS_k(m) = NR_k(m) - \sum_{u=1-U} s2_u(m) \quad (9)$$

The above operations are on a sampled level, so signal $\mathbf{s2}_u(n)$ should be transformed to a sampled level to form $\mathbf{s2}_u(m)$. Every sampled value can be considered evenly distributed.

In the second step, all multipath components in $NS_k(m)$ are searched and solved. Multipath components distributed on this formed beam direction are searched. The searching is performed in the digital signal $NS_k(m)$ formed above. Each time one sample point m is moved to get a new set $\mathbf{s1}_{kj}(n)$. With a known scramble code pn_code(n), correlated $y_{kj}(n)$ is obtained on a symbol level and its total energy is calculated as represented by the formula:

$$P_j = \sum_{n=1-M'} y_{kj}(n) * y_{kj} * (n) \quad (10)$$

where M'=M−1, and M is number of all chips for counted L symbols. In the above formula, only T numbers of interference whose energy exceeds a threshold value are retained. Then s $y_{kt}(n)$ is scrambled with a known scramble code pn_code(n) and the $t^{th}$ interference value in input data $\mathbf{s3}_{kt}(n)$ is obtained as represented by the formula:

$$s3_{kt}(n)=y_{kt}(n)*pn\_code(n) \quad (11)$$

Obviously, the searching is only made within one symbol. Searching numbers needed are equal to the sample numbers in each chip times SF−1, where SF is the spread spectrum coefficient.

In the third step, the multipath signal is cancelled. In $NS_k(m)$, multipath signals coming from other users are cancelled and $SS_k(m)$ obtained. Interference data signals exceeding a threshold value are subtracted from the input data signal $NS_k(m)$ obtained at step 2. Then multipath interference signals coming from other users are canceled as represented by the formula:

$$SS_k(m) = NS_k(m) - \sum_{t=1-T} s3_{kt}(m) \quad (12)$$

The operation is going on at a sample level, so that $\mathbf{s3}_{kt}(n)$ should be transformed to a sample level to form $s3_{kt}(m)$. Here, each sample value is evenly distributed.

In the fourth step, output $RS_k(l)$ after interference cancellation is obtained. From sample value $SS_k(m)$, in which multipath interference signals from other users have been canceled, each chip level digital signal value $\mathbf{s4}_k(n)$ is obtained. The main path signal of the $k^{th}$ code channel is superposed with the multipath signal of the $k^{th}$ code channel, in phase coincidence. Then with de-scrambling and de-spread spectrum using the $k^{th}$ spread spectrum code, the output signal $RS_k(l)$ after interference is canceled can be obtained.

Further, the process includes demodulating in step 320, a result after interference cancellation is finally obtained. Data is outputted and the procedure is ended at step 308.

Obviously, the above process should be done for the entire code channel which have error code, i.e. the process should be done K times (signal-to-noise ratio greater than a threshold value) to achieve the purpose of canceling interference for all code channels.

Figure 4:
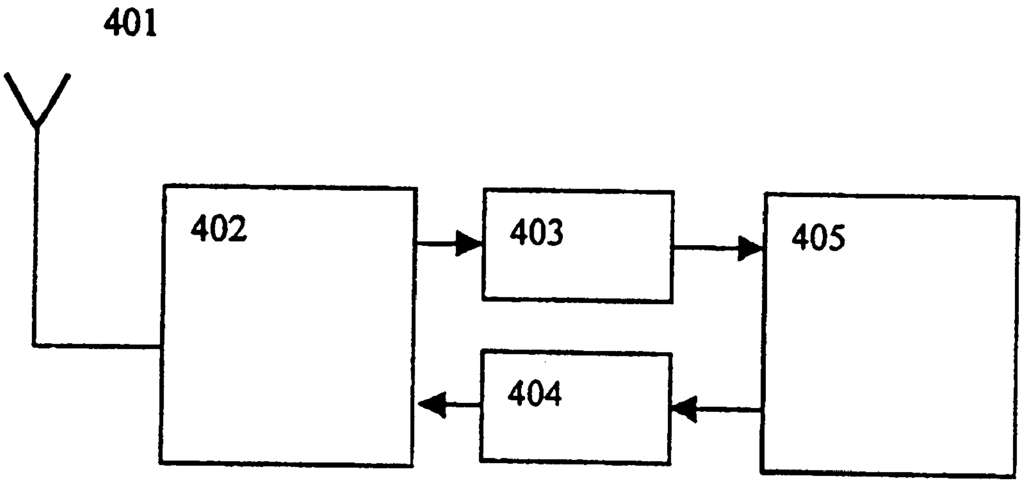
FIG. 4 is a structure diagram of user terminal for mobile communication.

FIG. 4 shows a CDMA user terminal structure using the method of the invention. The CDMA user terminal includes antenna 401, radio transceiver 402, analog to digital converter 403, digital to analog converter 404 and baseband signal processor 405. A method of the invention will be implemented in baseband signal processor 405.

In this structure, output of analog to digital converter 403 can be directly used for input digital signal $NR_k(m)$ mentioned above. Then interference can be cancelled by the first step to the fourth step mentioned above. During the first step, which cancels the main path signals coming from other users, those main path signals $F_v(l)$ can be directly obtained by de-scrambling and de-spreading without using formula (5) mentioned above and it starts directly from formula (6) mentioned above.

In the method of the invention, beam forming is carried out at the base station. When the method of the invention is used at a user terminal, the receiving signal received by the user terminal itself is the digital signal $NR_k(m)$ after beam forming. According to the numbers of code channels k needed to be received by the user terminal, with the four steps mentioned above, interference cancellation can proceed.

Although the present invention is described with regard to CDMA mobile communication systems, simple variances allow its use in mobile communication systems with frequency division multiple access and time division multiple access. One skilled in the art of radio communication systems, after understanding the principles of smart antennas and having a basic knowledge of digital signal processing, can design high quality smart antenna systems according to the method of the invention, and use it in various mobile communication systems or radio user loop systems.

The method of the invention also includes a new digital signal processing method, which can be used in CDMA mobile communication systems or other radio communication systems. It allows use of smart antenna and at the same time cancels interference of various multiple path propagation to provide a better result.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An interference cancellation method for a smart antenna comprising the steps of:

a) implementing beam formation for output digital signals of a receiver adopting a smart antenna using a beam forming matrix provided by a real time beam forming algorithm and obtaining a set of digital signals represented as $NR_k(m)$ after beam forming, wherein k represents code channels and m represents sample points;

b) canceling the main path signal of other users included in the set of digital signals $NR_k(m)$ to provide another set of digital signals represented as $NS_k(m)$, which includes needed signals and all interference signals, wherein k represents code channels and m represents sample points;

c) searching digital signals $NS_k(m)$ to provide all multipath signals distributed in the direction of the beam;

d) canceling multipath interference signals coming from other users in the digital signals $NS_k(m)$; and e) superposing main path and multiple path signals of working user terminals in phase coincidence to provide a digital signal with interference canceled.

2. The method according to claim 1, wherein the output digital signal of the receiver adopting the smart antenna in step a) is on a sample level.

3. The method according to claim 1, wherein step a) is performed in a base band signal processor and comprises the steps of:

synchronizing and eliminating over sampling of the output digital signal of the receiver adopting the smart antenna;

de-scrambling, de-spreading and dividing the output digital signal into each code channel signal;

forming a receiving beam for every link using a beam forming composite algorithm in a beam former; and obtaining the composite results.

4. The method according to claim 3, wherein said beam forming composite algorithm is a maximum power composite algorithm.

5. The method according to claim 1, wherein step a) further comprises:

demodulating the smart antenna output signal which is outputted by a beam former and detecting a signal-to-noise ratio of a training sequence; and outputting the receiving data directly and ending the procedure when the signal-to-noise ratio is greater than a threshold value, or executing steps b) to e) when the signal-to-noise ratio is less than a threshold value.

6. The method according to claim 3, wherein step a) further comprises:

demodulating the output signal of the smart antenna which is outputted by a beam former and detecting the signal-to-noise ratio of a training sequence; and outputting the receiving data directly and ending the procedure when the signal-to-noise ratio is greater than a threshold value, or executing steps b) to e) when the signal-to-noise ratio is less than a threshold value.

7. The method according to claim 1, wherein step b) further comprises:

identifying the main path of signals coming from other terminal users in the formed beam of a working code channel;

spreading the spectrum for the main path signals, adding scrambling code to the main path signals and recovering the main path signals as a sample level digital signal; and subtracting the main path of signals from other users having energy greater than a threshold value from the digital signals $NR_k(m)$ to provide the signals $NS_k(m)$.

8. The method according to claim 7, wherein the step of identifying the main path of signals coming from other terminal users in the formed beam of a working code channel comprises identifying the signal voltage level of other code channels in the working code channel beam.

9. The method according to claim 1, wherein step b) is executed on a sample level.

10. The method according to claim 1, wherein step c) further comprises:

moving the position of a sample point individually within one symbol and providing multiple sets of chip level signals;

correlating a scrambling code with the chip level signals to provide multiple sets of output with energy greater than a threshold value;

adding a known scrambling code to the output and recovering multipath interference of multiple sets with sample level;

subtracting multipath interference coming from other users from digital signals $NS_k(m)$ from step b), superposing the main path and multipath signals of a $k^{th}$ channel in phase coincidence and getting a $k^{th}$ channel sample value after interference cancellation; and de-scrambling, de-spreading and demodulating the sample value of the $k^{th}$ channel and getting the $k^{th}$ channel signal after interference cancellation, wherein k is any positive integer.

11. The method according to claim 1, wherein the step of searching in step c) is only taken within one symbol, and searching times equal the sample numbers within each chip times the spread spectrum coefficient minus 1.

12. The method according to claim 1, wherein step d) further comprises subtracting interference digital signals coming from other terminal users from digital signals $NS_k$ (m) from step b) to cancel multipath interference signals coming from other terminal users.

13. The method according to claim 1, wherein step d) is taken on a sample level, and the signals are converted to sample level signals.

14. The method according to claim 1, wherein step e) further comprises:

calculating a chip value by canceling the sample value of the main path and the multipath interference signals coming from other users;

after de-scrambling and de-spreading with a $k^{th}$ spread spectrum code, superposing the main path and multipath signals coming from working terminal users in phase coincidence to provide the outputting signal after interference cancellation; and after demodulating, providing the result after interference cancellation.

15. The method according to claim 1, wherein steps a), b), c), d) and e) cancel interference for all channels having a signal-to-noise ratio less than a threshold value.

16. The method according to claim 1, wherein steps a), b), c), d) and e) are used for interference cancellation in a mobile communication base station.

17. The method according to claim 1, wherein steps b), c), d) and e) are used for interference cancellation in a user terminal.

* * * * *